United States Patent [19]

Harlan et al.

[11] 3,800,328

[45] Mar. 26, 1974

[54] TWO-WAY DOOR ASSEMBLY FOR A CASSETTE TAPE PLAYER

[75] Inventors: Alfred R. Harlan, Glendale Heights; Ronald E. Petersen, Des Plaines, both of Ill.

[73] Assignee: Motorola, Inc., Franklin Park, Ill.

[22] Filed: Apr. 28, 1972

[21] Appl. No.: 248,508

[52] U.S. Cl. .................... 360/137, 360/96, 49/386
[51] Int. Cl. ....... G11b 1/02, G11b 23/04, E05f 1/14
[58] Field of Search .......... 274/4 A, 4 B, 4 C, 11 A, 274/11 B, 4 R; 49/386, 387; 232/46, 44

[56] References Cited

UNITED STATES PATENTS

| | | | |
|---|---|---|---|
| 1,548,436 | 8/1925 | Boucher | 49/386 |
| 3,521,888 | 7/1970 | Kaneda | 274/4 B |

*Primary Examiner*—Bernard Konick
*Assistant Examiner*—David Moore
*Attorney, Agent, or Firm*—Ronald J. LaPorte; Vincent J. Rauner

[57] ABSTRACT

A two-way door assembly for a cassette tape player includes a door mounted at a first end for rotation about an independently rotatable support shaft. A first biasing spring is coupled to the door to bias the latter in a first rotational direction to a normally closed condition. A cassette inserted into the player tensions the first biasing spring. The spring returns the door to the closed condition subsequent to full insertion of the cassette into the player. When ejected, the movement of the cassette rotates the door in the opposite direction. A coupling pin extending from the support shaft is engaged by the door to rotate the shaft against a second biasing spring to tension the latter. Once the cassette is ejected, the second biasing spring rotates the shaft and door to their normal conditions.

7 Claims, 4 Drawing Figures

TWO-WAY DOOR ASSEMBLY FOR A CASSETTE TAPE PLAYER

BACKGROUND

This invention relates generally to cassette tape players and more particularly to a door assembly covering the cassette receiving opening in such a player.

In the case of a cassette tape player, the cassette is normally inserted fully into the player and is then either lowered onto tape driving spindles or the spindles are lifted into the hubs of the tape wheels of the cassette for driving the tape therethrough past a magnetic tape head positioned adjacent the cassette. After the completion of the playing or recording of information on the tape in the cassette, the latter is ejected from the player.

A door assembly provided to cover the cassette receiving opening in a cassette player must either remain open during the time the cassette is within the player or if it is closed, must be capable of being opened in a reverse direction to permit ejection of the cassette from the player. A door left open during the playing or recording period detracts from the appearance of the tape player.

SUMMARY

Accordingly, it is a primary object of the present invention to provide a door assembly for a cassette tape player which can be opened in a first direction to permit insertion of a cartridge into the player, closed during the playing/recording period and opened in the opposite direction upon ejection of the cassette from the player.

It is another object of the invention to provide a two-way door assembly of the above described type which is simple in construction and reliable in operation.

It is yet another object of the present invention to provide a two-way door assembly which is adaptable for use with substantially all cassette players which include a mechanism for ejecting a cassette from the player.

Briefly, a preferred embodiment of the two-way door assembly for a cassette player according to the invention includes a door member mounted at a first end for rotation about a support shaft. A first biasing spring at one end of the shaft is coupled to the door member to bias the latter in a first rotational direction to a closed condition. Insertion of a cassette into the player in engagement with the door member causes the latter to be rotated about the shaft against the biasing force of the first spring. After the cassette is inserted into the player, the door is released and the first spring biases the door to a closed condition.

Upon ejection of the cassette, the latter engages the door from the opposite side thereof causing it to swing in a reverse direction. A coupling pin extending outwardly from the support shaft, substantially perpendicular to the longitudinal axis thereof, is engaged by the first end of the door member, causing the shaft to rotate therewith. A second biasing spring coupled to the shaft to bias the latter in a rotational direction opposite to that of the first biasing spring, is tensioned to return the shaft and door member to a closed condition after the cassette has been ejected from the player.

DETAILED DESCRIPTION

Figure 1:
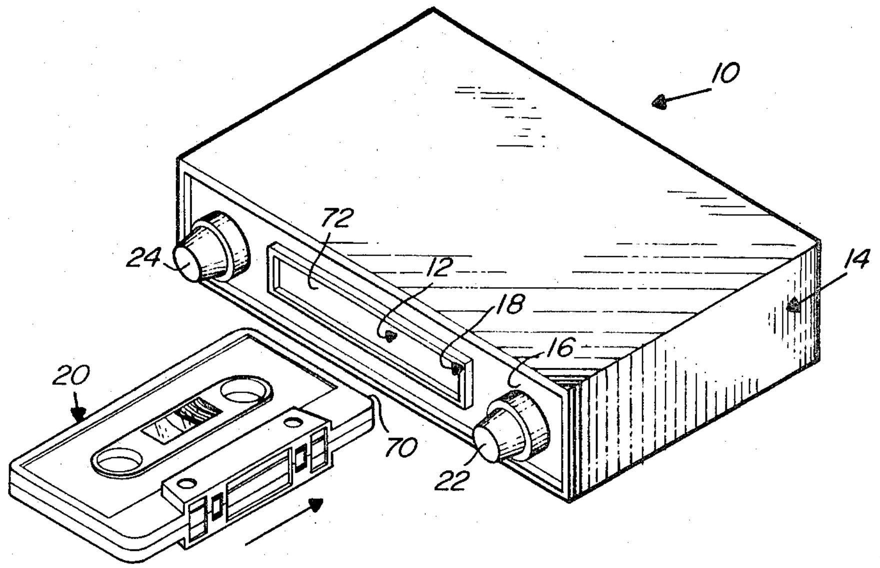
FIG. 1 is a perspective view of a cassette and cassette tape player, the latter of which incorporates a two-way door assembly according to the invention.

Referring now to the drawings in greater detail wherein like numerals have been employed throughout the various views to designate similar components, there is shown in FIG. 1 a cassette tape player 10 incorporating a two-way door assembly designated generally by the numeral 12, according to the invention.

The cassette player 10 includes an outer housing 14 including top, base and side walls and a front panel or wall 16 having an opening 18 therein for receiving tape cassettes, such as 20. Control knobs 22, 24 for operating the tape playing instrumentalities (not shown) within the player also are mounted on front panel 16.

Figure 2:
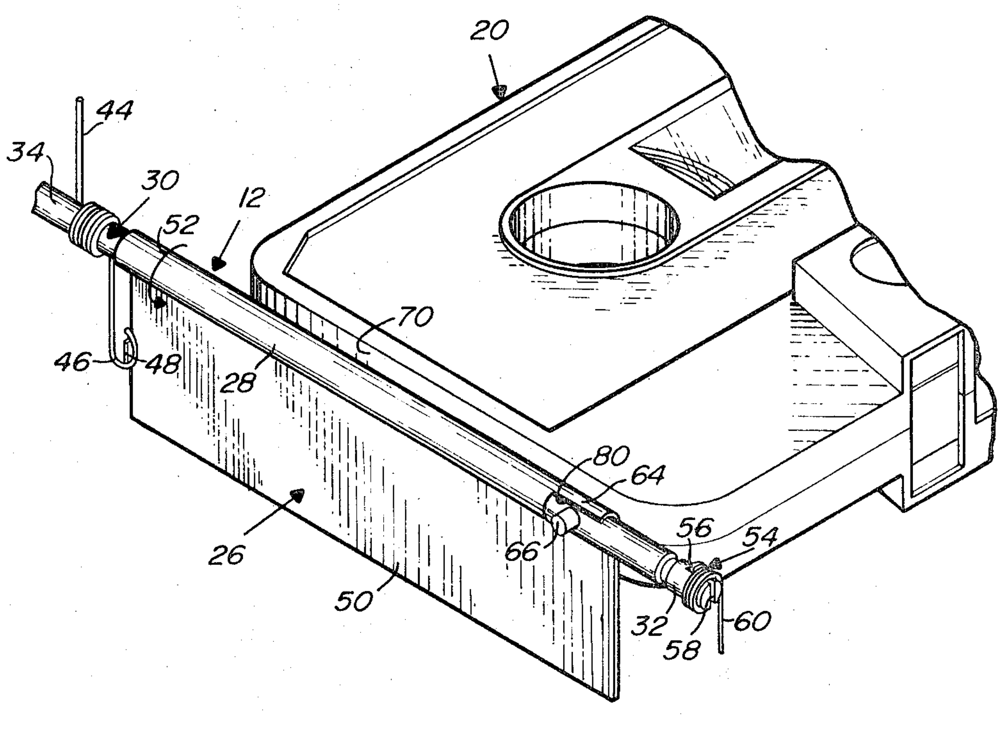
FIGS. 2–4 are enlarged, fragmentary, perspective views of the two-way door assembly according to the invention as seen from the interior of the cassette player, illustrating the operation of the door assembly during receipt and ejection of a cassette.
Figure 3:
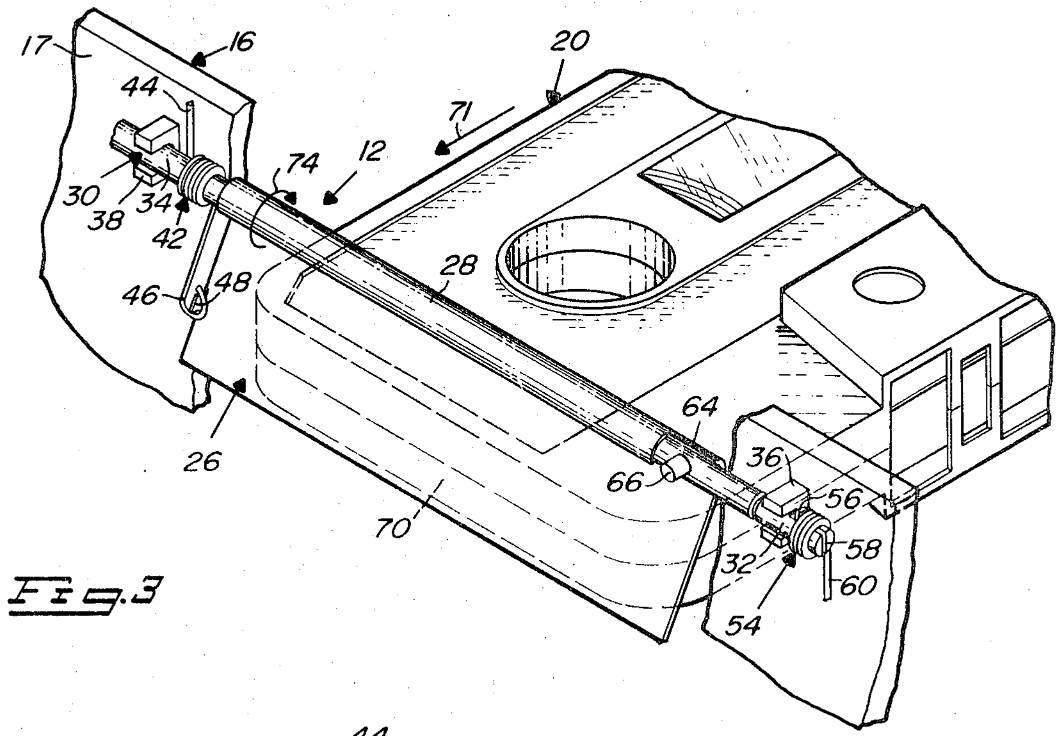
Figure 4:
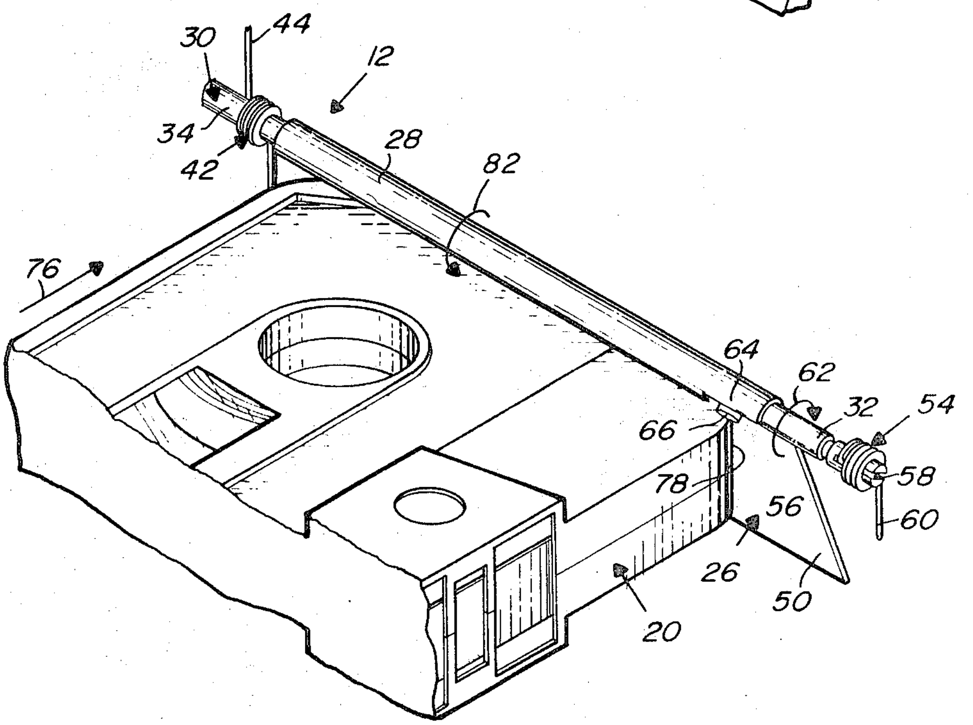

The two-way door assembly 12 according to the invention, is mounted on the interior surface 17 of front wall 16 of the cassette player over cassette receiving opening 18 in the front panel. Referring to FIGS. 2–4, there is shown therein the two-way door assembly 12 as seen from the interior of player 10. The door assembly 12 includes a door member 26 having formed along the top end thereof a curved portion 28 through which a support bar shaft 30 passes for mounting the door in opening 18. The ends 32, 34 of the support shaft are mounted in suitable bearing supports 36, 38, respectively, (FIG. 3) extending from the interior surface 17 of front panel 16. Door member 26 is rotatable about the support shaft independently of the rotation of shaft 30 itself in supports 36, 38.

A first biasing spring 42 is mounted on the support shaft 30 near end 34 thereof. One end 44 of the spring extends upwardly engaging the surface 17 of wall 16. The opposite end 46 of the spring contacts door member 26. To insure engagement of the door member 26, end 46 of spring 42 is formed into a loop which receives a tab 48 extending from the interior facing surface 50 of door member 26. Biasing spring 42 provides a force against door member 26 in a counterclockwise direction (see arrow 52, FIG. 2) as seen in the drawings, to maintain the door member in a normally closed condition.

A second biasing spring 54 is coupled to the opposite end 32 of the support shaft. One end 56 of the spring extends into a slotted aperture 58 in the support shaft and the opposite end 60 of the spring engages front wall surface 17. Spring 54 acts on shaft 30 tending to rotate the shaft in a clockwise direction, (see arrow 62, FIG. 4) to return the shaft to a normal position as shown in FIG. 2.

A section of the curved end portion of the door member 26 is, at one side 64 thereof, cut away to permit a pin 66 on support shaft 30 to extend outwardly therefrom. The pin is substantially perpendicular to the longitudinal axis of the shaft 30. As will be explained hereinafter in greater detail, pin 66 serves to couple support shaft 30 to door member 26 for rotation of the latter in response to the rotation of shaft 30, subsequent to the ejection of a tape cassette from the player.

For purposes of affording a more complete understanding of the invention, it is advantageous now to provide a functional description of the mode in which the component parts thus far described co-operate.

Referring again to FIGS. 1 and 2, prior to insertion of cassette 20 into opening 18 of the cassette player, the door member 26 is maintained in a closed position to cover the opening 18. Insertion of the tape cassette 20 into the opening in the direction of arrow 71 (FIG. 3) causes the leading edge 70 of the cassette to engage the front surface 72 (FIG. 1) of door member 26. The force provided by the moving tape cassette causes door member 26 to pivot or swing about shaft 30, as indicated by arrow 74 (FIG. 3) inwardly of the tape player against the force of biasing spring 42. The support shaft 30 remains substantially stationary during insertion of the cassette into the player. Once fully inserted into player 10, the force of spring 42 returns the door member to a closed position over opening 18.

Upon ejection of tape cassette 20 from the player in the direction of arrow 76 as shown in FIG. 4, the opposite end 78 thereof engages the interior surface 50 of door member 26 causing the last-mentioned door member to rotate about support shaft 30 in the opposite direction (see arrow 82, FIG. 4). Almost immediately after the door member 26 is engaged by the cassette being ejected from the player, the edge 80 of curved portion 28 of the door member 26 engages pin 66, thus imparting, through the last-mentioned pin, rotation to shaft 32. The rotation of support shaft 32 causes spring 54 to become tensioned or wound more tightly on the shaft. Thus, when cassette 20 has been completely removed from player 10, the tensioned spring 54 rotates the shaft in the direction of arrow 62 (FIG. 4). Pin 66, engaging edge 80 of the curved portion of door member 26, returns the door member to a closed position whereat spring 42 engages the door member once again to prevent the latter from swinging inwardly of opening 18.

It should be noted that the force provided by biasing spring 54 is less than that provided by spring 42 to permit easy ejection of the cassette from player 10.

The two-way door assembly according to the invention is efficient in operation, relatively simple in construction and enhances the appearance of a cassette player in which it is incorporated by preventing the exposure of the internal portion of the player during the playing/recording of information on a tape cassette and when the cassette player is not in use.

While a particular embodiment of the invention has been shown and described, it should be understood that the invention is not limited thereto since many modifications may be made. It is therefore contemplated to cover by the present application any and all such modifications as fall within the true spirit and scope of the appended claims.

We claim:

1. A two-way door assembly for a cassette tape player having an opening dimensioned to receive a tape cassette, said door assembly including in combination: a support shaft, a door member mounted for rotation at a first end thereof on said support shaft, first spring means tensioned to provide a force against said door member only in a first rotatable direction for returning said door member to a closed condition over said cassette receiving opening subsequent to the receipt of a cassette through said opening into said player in a second, opposite rotatable direction, second spring means coupled to said rotatable support shaft for returning said door member to a closed condition over said cassette receiving opening subsequent to the ejection of a cassette from said player through said opening in said first rotatable direction and coupling means for coupling said rotatable shaft to said door member upon ejection of said cassette whereby said second spring means is tensioned, said second spring means rotating said support shaft and said door member only in said second rotatable direction to return the latter to a closed condition over said opening subsequent to the ejection of said cassette from said player.

2. A two-way door assembly as claimed in claim 1 wherein said support shaft is rotatably mounted adjacent said opening, wherein said door member includes at a first end thereof a curved portion, said support shaft being received longitudinally therein to support said door member rotatably thereon, independent of the rotation of said shaft.

3. A two-way door assembly for a cassette tape player including a side wall having an opening therein for receiving tape cassettes, said door assembly including in combination: a support shaft mounted for rotation on a first surface of said side wall adjacent said opening, a door member having a curved end portion receiving said support shaft therethrough for mounting said door member rotatably on said shaft, independent of the rotation of said support shaft, first biasing spring means coupled to said door member and providing a biasing force thereagainst in a first rotatable direction to move said door member rotatably to a closed condition subsequent to the receipt of a tape cassette in said player through said opening, second biasing spring means coupled to said rotatable shaft and providing a biasing force there-against in a second rotatable direction opposite from said first direction and coupling means for coupling said rotatable shaft and said door member upon ejection of said cassette through said opening from said player whereby said second spring means is tensioned, said second spring means rotating said support shaft and said door member in said second rotatable direction to return the latter to a closed condition over said opening subsequent to the ejection of said cassette from said player.

4. A two-way door assembly as claimed in claim 3 wherein said coupling means includes a member extending from said support shaft transverse the longitudinal axis thereof for engagement with the curved end portion of said door member.

5. In a cassette tape player having an outer housing including a side wall having an opening therein for receiving a tape cassette, a two-way door assembly provided to cover said opening upon insertion of a tape cassette into said player through said opening and subsequent to the ejection of a cassette from said player through said opening, said door assembly including in combination: a support shaft mounted for rotation on the interior surface of said side wall adjacent said opening, a door member including means at a first end thereof for mounting said door member on said support shaft for rotation thereabout independent of the rotation of said shaft, a first biasing spring mounted for engagement with said door member, providing a force thereagainst in a direction opposite from the direction of insertion of a cassette into said player through said opening, said first biasing spring being tensioned by the opening of said door member upon insertion of a cassette into said player and returning said door member to a closed condition upon full insertion of said cassette into said player, a second biasing spring coupled to said rotatable support shaft to provide a rotational force thereto in the direction of insertion of a cassette into said player and coupling means for coupling said door member and said rotatable support shaft upon ejection of a cassette from said player through said opening in a direction opposite from the direction of insertion of said cassette into said player, said cassette engaging said door member at the interior surface thereof to rotate the latter in said opposite direction, whereby said shaft is rotated to tension said second biasing spring, said second biasing spring returning said door member to a closed condition subsequent to the ejection of said cassette from said player past said door member.

6. A cassette tape player as claimed in claim 5 wherein said door member mounting means include a curved end portion formed along an edge of said door member and receiving said support shaft therethrough, and wherein said coupling means includes a pin member extending outwardly from said shaft substantially perpendicular to the longitudinal axis thereof for engagement by a predetermined section of said curved edge portion upon rotation of said door member in said opposite direction during the ejection of said cassette from said player, said pin member engaging said predetermined section of said curved edge portion of said door member to return said door member to a closed condition subsequent to the ejection of said cassette from said player.

7. A cassette tape player as claimed in claim 6 wherein said rotatable support shaft is mounted adjacent the upper edge of said cassette receiving opening, wherein said curved edge portion of said door member is provided along the top edge thereof and wherein said first biasing spring is mounted on a first end of said rotatable support shaft with a first end of said spring engaging the interior surface of said side wall of said cassette housing and the second end of said spring being positioned for engagement with the interior surface of said door member upon insertion of a cassette into said player through said opening and wherein said second biasing spring is mounted at the opposite end of said rotatable shaft with a first end thereof inserted into an aperture provided in said rotatable shaft and the opposite end thereof engaging the interior surface of said side wall of said tape player housing.

* * * * *